Figure 1:
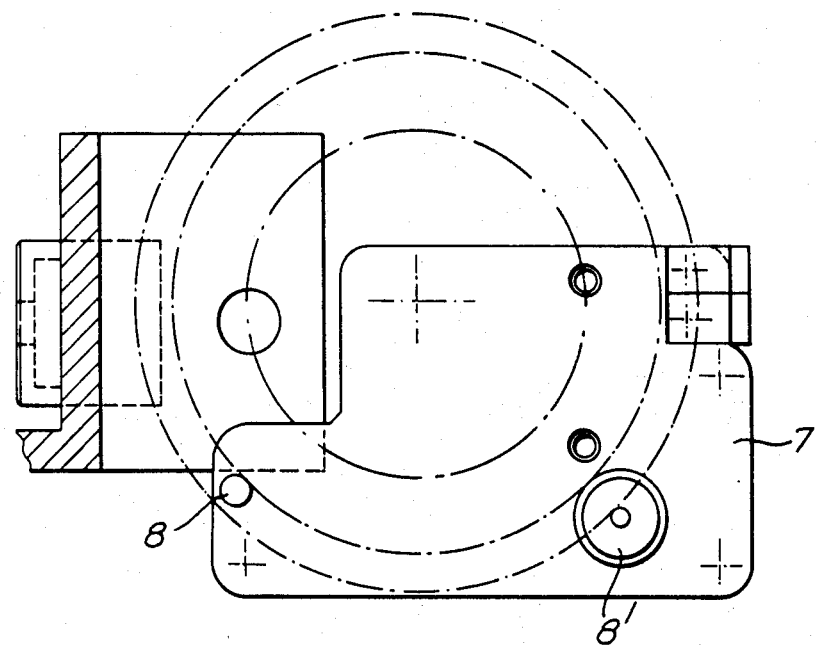

United States Patent [19]

Ekholm

[11] 4,405,206
[45] Sep. 20, 1983

[54] FILTER DEVICE FOR THE FILTRATION OF RADIATION

[75] Inventor: Pertti Ekholm, Helsinki, Finland
[73] Assignee: Labsystems Oy, Finland
[21] Appl. No.: 275,745
[22] Filed: Jun. 22, 1981
[51] Int. Cl.$^3$ .......................... G02B 5/20; G02B 7/00
[52] U.S. Cl. ........................................ 350/318; 350/317
[58] Field of Search ....................... 350/318, 317, 254

[56] References Cited

U.S. PATENT DOCUMENTS

| | | | |
|---|---|---|---|
| 2,953,970 | 9/1960 | Maynard | 350/318 |
| 3,320,018 | 5/1967 | Pepke | 350/317 |

*Primary Examiner*—Jon W. Henry

[57] ABSTRACT

The invention is a filter device for the filtration of radiation in a device for measuring radiation. The filter device comprises several different filters fitted into one detachable disk. The filter device comprises a magnet which is placed at a vertical plane passing through the center axis of the filter disk, not higher than at the level of the center axis. The filter disk includes a second magnet placed at the center axis of the disk. The opposite poles of these two magnets are arranged as facing towards each other.

2 Claims, 3 Drawing Figures

FILTER DEVICE FOR THE FILTRATION OF RADIATION

The present invention is directed to a filter device for the filtration of radiation in a device for measuring radiation, said filter device comprising several different filters which are positioned within a detachable disk.

In accordance with the device of the present invention, it is possible to exchange several filters simultaneously and rapidly in various types of devices, as for example in a photometer or fluorometer. Moreover, the present invention permits automatic securing of the filter and ensures that the filters are in the correct position in relation to the source of radiation.

In currently available measurement devices (e.g., photometer or fluorometer) the filters, which are often high-standard interference filters, are exchanged manually, or are mounted in manually or automatically movable disks which are a fixed component of the device. In many instances, these filters are hard to detach and replace. Frequently filters are positioned incorrectly, such that the wrong side faces the source of radiation, in which case the filters become excessively heated and are therefore prematurely aged.

The present invention is characterized in that the filter device includes a stationary magnetic element which is positioned in a horizontal plane which passes through but not higher than the center axis of the filter disk. The filter disk also includes a magnetic element placed at the center axis of the disk, such that the opposite poles of the two magnetic elements are facing toward each other when the disk is properly inserted into the filter device.

By means of the device in accordance with the invention, several advantages are achieved, such as:

1. Simultaneous replacement of several filters takes place in a few seconds.
2. In connection with the replacement, the filter wheel does not have to be detached or secured by means of any particular fastening elements.
3. Incorrect positioning of the filter disk is prevented thereby avoiding premature damaging and ageing of the filter.
4. The present invention allows the filter mechanism to be of a simple construction since no precise tolerances are necessary, thereby considerably lowering the cost of production.

Figure 2:
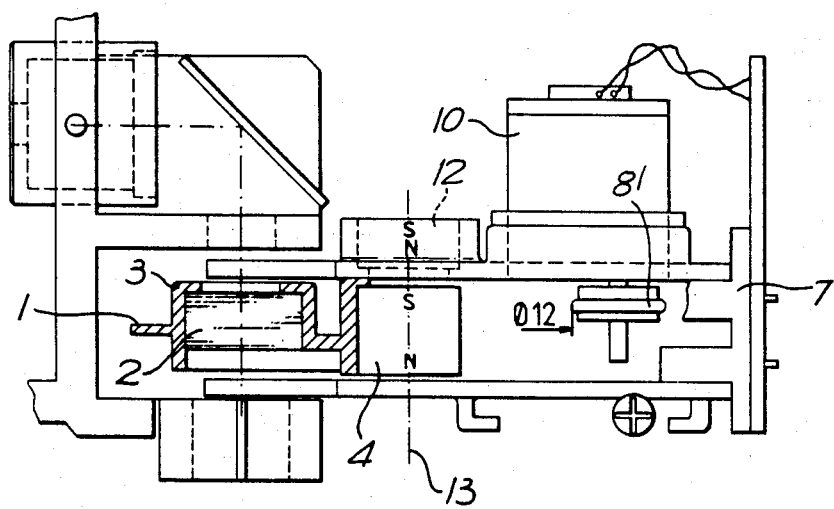
Figure 3:
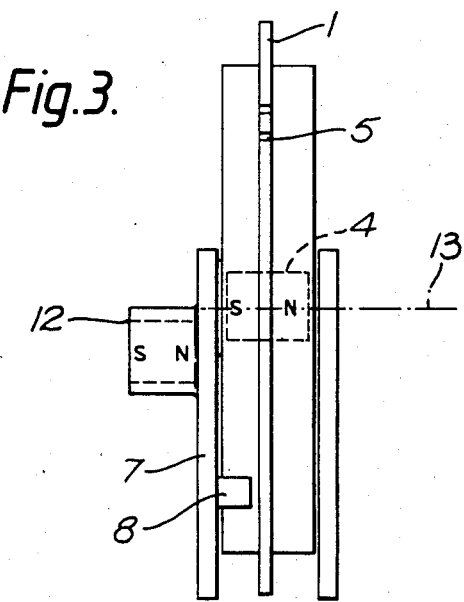

An embodiment of the invention will be described in more detail below with reference to the attached drawing, wherein FIG. 1 is a front view, in section, and without the filter disk of a device in accordance with the invention, FIG. 2 is a top view of the device partly in section, and FIG. 3 is a side view of the device.

The filter wheel 1 has a plurality of filters 2 in compartments of their own. Usually filters 2 admit the passage of a certain wave-length band, whose properties vary depending on the type of the filter. Filters 2 are positioned on filter wheel 1 by means of support units 3 in such a manner that they are equally spaced from the center point 13 of wheel 1. Filter wheel 1 also includes a magnetic element 4 and an automatically readable code 5 which indicates the position of the filter wheel and the various filters positioned therein. Magnetic element 4 is place at the center point of the wheel.

When filter wheel 1 is placed in filter mechanism 7 of the measurement device, filter wheel 1 rests on rotary support units 8 and 8'. Motor 10 is coupled directly to support unit 8'. When motor 10 rotates support unit 8', filter wheel 1 in turn rotates since it is being supported by support units 8 and 8'.

Filter mechanism 7 includes a stationary magnetic element 12, which is located slightly below the center axis 13 of filter wheel 1. Magnetic element 4 of filter wheel 1 is positioned at center 13 such that the opposite magnetic poles of magnetic element 4 and stationary magnetic element 12 tend to attract each other. The magnetic elements are positioned so that their magnetic poles are next to each other, whereby the magnetic force pulls filter wheel 1 downwards and, at the same time, against support units 8 and 8' of filter mechanism 7. The above arrangement assures that filter wheel 1 is correctly positioned within filter mechanism 7, so that motor 10 and support unit 8', constituting an extension of the motor, are capable of rotating filter wheel 1. The above arrangement additionally assures that the individual filters are correctly positioned in relation to the source of radiation.

If filter wheel 1 is incorrectly placed into the filter mechanism 7, the equal poles of magnetic elements 4 and 12 repel each other. The operator easily notices this rejection, e.g., when the filter wheel is being placed in position, a small jerk is felt and the filter wheel does not rotate even when the motor is operated.

If, due to different filters, the disk is out of balance, this balance does not result in the gravitational force turning the disk only to one position in the device, since the magnetic force keeps the disk in the set position.

The magnetic force also functions to increase the friction between the drive wheel 8' and the disk 1.

The present invention is not restricted to the above embodiment, but includes considerable variations. Indeed, the stationary magnetic device of the filter device does no necessarily have to be placed below the center axis of the filter disk, but it may also be placed level with said center axis.

What is claimed is:

1. A filter device for the filtration of radiation in a device for measuring radiation, said filter device comprising a plurality of individual filters fitted into a detachable filter disk wherein the filter device comprises a first magnetic elemet which is positioned at a horizontal plane located between the center axis of the filter disk, and the bottom edge of said disk, said filter disk being provided with a second magnetic element positioned at its center axis, such that the opposite poles of said first and second magnetic elements are arranged proximate to and facing each other.

2. A filter device in accordance with claim 1, wherein said first magnetic element coincides with the center axis of the filter disk.

* * * * *

UNITED STATES PATENT AND TRADEMARK OFFICE
CERTIFICATE OF CORRECTION

PATENT NO. : 4,405,206
DATED : September 20, 1983
INVENTOR(S) : Pertti Ekholm

It is certified that error appears in the above—identified patent and that said Letters Patent is hereby corrected as shown below:

In Claim 1, line 5, delete "elemet" and insert

--element--.

Signed and Sealed this

Third Day of April 1984

[SEAL]

Attest:

GERALD J. MOSSINGHOFF

Attesting Officer     Commissioner of Patents and Trademarks